(12) United States Patent
Horikawa et al.

(10) Patent No.: US 10,134,532 B2
(45) Date of Patent: Nov. 20, 2018

(54) ELECTRIC DOUBLE-LAYER CAPACITOR

(71) Applicant: Murata Manufacturing Co., Ltd., Nagaokakyo-shi, Kyoto-fu (JP)

(72) Inventors: Keiji Horikawa, Nagaokakyo (JP); Takayuki Hata, Nagaokakyo (JP); Tadahiro Minamikawa, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 15/695,341

(22) Filed: Sep. 5, 2017

(65) Prior Publication Data

US 2017/0365421 A1 Dec. 21, 2017

Related U.S. Application Data

(63) Continuation of application No. PCT/JP2016/053861, filed on Feb. 9, 2016.

(30) Foreign Application Priority Data

Mar. 24, 2015 (JP) .................................. 2015-061652

(51) Int. Cl.
*H01G 9/00* (2006.01)
*H01G 11/00* (2013.01)
(Continued)

(52) U.S. Cl.
CPC .............. *H01G 11/76* (2013.01); *H01G 2/04* (2013.01); *H01G 11/10* (2013.01); *H01G 11/26* (2013.01);
(Continued)

(58) Field of Classification Search
CPC ........ H01G 11/76; H01G 11/10; H01G 11/26; H01G 11/80; H01G 11/62; H01G 9/08;
(Continued)

(56) References Cited

U.S. PATENT DOCUMENTS 7,203,056 B2 * 4/2007 Thrap ...................... H01G 9/26
361/502
7,417,845 B2 * 8/2008 Higashi .................. H01G 9/016
361/502

(Continued)

FOREIGN PATENT DOCUMENTS

JP 2004-296520 A 10/2004
JP 2011-014859 A 1/2011

OTHER PUBLICATIONS

International Search Report issued in International Application No. PCT/JP2016/053861, dated Apr. 26, 2016.

(Continued)

*Primary Examiner* — Angel R Estrada
(74) *Attorney, Agent, or Firm* — Arent Fox LLP

(57) ABSTRACT

A package electric double-layer capacitor having a first terminal that extends from a package at a first corner of a first cell, which is adjacent to a second cell, on one side in a second direction orthogonal to a first direction. A second terminal extends from the package at the first corner in the first direction and on a side of the first terminal opposite to the second cell. A third terminal extends from the package at a second corner of the second cell, which is adjacent to the first cell and the first corner. A fourth terminal extends from the package at the second corner in the first direction and on a side of the third terminal opposite to the first cell.

9 Claims, 7 Drawing Sheets

(51) Int. Cl.
    *H01G 11/76*     (2013.01)
    *H01G 11/10*     (2013.01)
    *H01G 2/04*      (2006.01)
    *H01G 11/26*     (2013.01)
    *H01G 11/80*     (2013.01)
    *H01G 11/62*     (2013.01)
(52) U.S. Cl.
    CPC ............. *H01G 11/80* (2013.01); *H01G 11/62* (2013.01); *Y02E 60/13* (2013.01)
(58) Field of Classification Search
    CPC . H01G 9/00; H01G 9/155; H01G 9/26; Y02E 60/13
    USPC ................ 361/502, 500, 517, 518, 522, 541
    See application file for complete search history.

(56)        References Cited

U.S. PATENT DOCUMENTS 8,310,812 B2 *  11/2012  Ashizaki ................ H01G 9/016
                                                     361/502
    8,755,169 B2 *   6/2014  Kuriki .................... H01G 11/02
                                                     361/502
    2010/0188800 A1  7/2010  Ashizaki et al.

OTHER PUBLICATIONS

Written Opinion of the International Searching Authority issued in International Application No. PCT/JP2016/053861, dated Apr. 26, 2016.

* cited by examiner

ELECTRIC DOUBLE-LAYER CAPACITOR

CROSS REFERENCE TO RELATED APPLICATIONS

The present application is a continuation of International application No. PCT/JP2016/053861, filed Feb. 9, 2016, which claims priority to Japanese Patent Application No. 2015-061652, filed Mar. 24, 2015, the entire contents of each of which are incorporated herein by reference.

FIELD OF THE INVENTION

The present invention relates to an electric double-layer capacitor.

BACKGROUND OF THE INVENTION

Conventionally, capacitors have been widely used in various kinds of electronic devices such as cellular phones. Examples of known capacitors include an electric double-layer capacitor (EDLC) as disclosed in Patent Document 1. The electric double-layer capacitor involves no chemical reaction at charging and discharging unlike a secondary battery, and thus has advantages such as a long product lifetime and capability of charging and discharging with a large current in a short time.

For example, Patent Document 1 discloses a package electric double-layer capacitor. The electric double-layer capacitor disclosed in Patent Document 1 includes, in a package, two cells each encapsulating an element. The elements each have a rectangular shape and are arrayed in the transverse direction. A total of four equally spaced terminals extend from the two elements.

Patent Document 1: Japanese Patent Laid-open No. 2004-296520

SUMMARY OF THE INVENTION

There is a need to suppress impedance increase in a package electric double-layer capacitor such as that disclosed in Patent Document 1.

The present invention is mainly intended to provide a package electric double-layer capacitor having low impedance.

An electric double-layer capacitor according to the present invention includes a first electric double-layer capacitor element having a rectangular shape, a second electric double-layer capacitor element having a rectangular shape, a package, and an electrolytic solution. The first electric double-layer capacitor element includes first and second terminals. The second electric double-layer capacitor element is disposed on a side in a first direction with respect to the first electric double-layer capacitor element. The second electric double-layer capacitor element includes third and fourth terminals. The package includes a first cell having a rectangular shape, and a second cell having a rectangular shape. The first cell encapsulates the first electric double-layer capacitor element. The second cell encapsulates the second electric double-layer capacitor element. The electrolytic solution fills each of the first and second cells. The first terminal is extended from the package at a first corner of the first cell, which is adjacent to the second cell, on a first side in a second direction orthogonal to the first direction. The second terminal is extended from the package at a location adjacent to the first terminal at the first corner in the first direction and on a side of the first terminal opposite to the second electric double-layer capacitor element. The third terminal is extended from the package at a second corner of the second cell, which is adjacent to the first cell and the first corner. The fourth terminal is extended from the package at a location adjacent to the third terminal at the second corner in the first direction and on a side of the third terminal opposite to the first electric double-layer capacitor element.

With the above-described configuration, the first and third terminals can be disposed close to each other, which leads to a low equivalent series resistance. In addition, negative and positive electrode terminals of each electric double-layer capacitor element can be disposed close to each other. Thus, a magnetic field generated around the negative electrode terminal and a magnetic field generated around the positive electrode terminal cancel each other. As a result, when receiving application of high-frequency wave or alternating-current power, the electric double-layer capacitor according to the present invention has low impedance.

In the electric double-layer capacitor according to the present invention, the first direction may be parallel to longitudinal directions of the first and second electric double-layer capacitor elements.

In the electric double-layer capacitor according to the present invention, it is preferable that the first electric double-layer capacitor element includes first and second electrodes facing each other, and the first and second electrodes each include: a first electrode body having a rectangular shape; a first extended portion positioned at the first corner, extending from the first electrode body toward the first side in the second direction, and is connected with one of the first and second terminals; and a second extended portion positioned at a third corner of the first cell on the first side in the second direction and extending from the first electrode body toward the first side in the second direction. The second electric double-layer capacitor element includes third and fourth electrodes facing to each other, and the third and fourth electrodes each include: a second electrode body having a rectangular shape; a third extended portion positioned at the second corner, extending from the second electrode body toward the first side in the second direction, and connected with one of the third and fourth terminals; and a fourth extended portion positioned at a fourth corner of the second cell on the first side in the second direction and extending from the second electrode body toward the first side in the second direction.

With this configuration, the electrolytic solution accumulates at parts where the extended portions are provided. Thus, when the electrolytic solution in a region between positive and negative electrodes is evaporated with temporal change, the electrolytic solution in the part where the electrolytic solution accumulates is supplied to the region between the positive and negative electrodes. In this manner, the electrolytic solution is unlikely to run short in the region between the positive and negative electrodes.

In the electric double-layer capacitor according to the present invention, it is preferable that, when a sealing portion along a side edge of the package on the first side in the second direction has a width L1 and a sealing portion positioned between the first and second cells of the package has a width L2, a relation of L1>L2 is satisfied. This configuration allows a large facing area of first and second internal electrodes, thereby achieving a large capacitance, a low resistance, and a long lifetime. Specifically, when the width L1 is increased, the speed of evaporation of the electrolytic solution is reduced so that the electric double-layer capacitor can have a longer lifetime. However, the width L2 does not affect the evaporation of the electrolytic solution. Thus, a large electrode area can be obtained by reducing the width L2 as much as possible.

DETAILED DESCRIPTION OF PREFERRED EMBODIMENTS OF THE INVENTION

Figure 1:
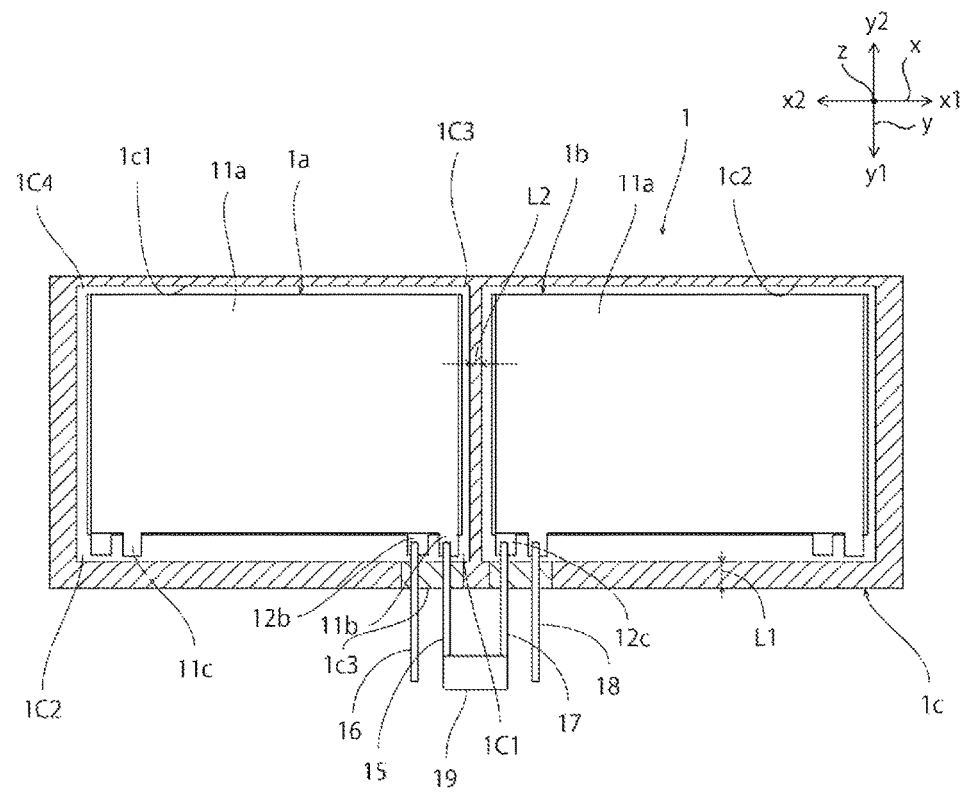
FIG. 1 is a schematic cross-sectional view of an electric double-layer capacitor according to an embodiment of the present invention.

Exemplary preferred embodiments of the present invention will be described below. The embodiments below are merely exemplary. The present invention is not limited by the embodiments below.

In the drawings to be referred to in the embodiments and modifications, any members having substantially identical functions are denoted by an identical reference sign. The drawings referred to in the embodiments and modifications are schematically illustrated. For example, ratios of the dimensions of objects illustrated in the drawings are different from those in reality in some cases. For example, the dimensional ratios of objects are different between the drawings in some cases. Specific values thereof should be determined based on the following description.

FIG. 1 is a schematic cross-sectional view of an electric double-layer capacitor according to the present embodiment.

This electric double-layer capacitor 1 illustrated in FIG. 1 includes a first electric double-layer capacitor element 1a and a second electric double-layer capacitor element 1b that are encapsulated in a package 1c. The first and second electric double-layer capacitor elements 1a and 1b each have a rectangular shape having a longitudinal direction parallel to an x-axis direction (first direction). The first and second electric double-layer capacitor elements 1a and 1b are disposed along the x-axis direction. Accordingly, the package 1c has a rectangular shape having a longitudinal direction parallel to the x-axis direction.

The package 1c is provided with a first cell 1c1 having a rectangular shape and a second cell 1c2 having a rectangular shape and disposed adjacent to the first cell 1c1 in the x-axis direction. The first cell 1c1 encapsulates the first electric double-layer capacitor element 1a. The second cell 1c2 encapsulates the second electric double-layer capacitor element 1b.

The cells 1c1 and 1c2 are filled with an electrolytic solution. The electrolytic solution contains a cation, an anion, and a solvent. Examples of preferable cations include tetra ethyl ammonium salt. Examples of preferable anions include, tetrafluoroborate ion ($BF_4^-$) and bis(trifluoromethylsulfonyl)imido (($CF_3SO_2$)$_2N^-$). Examples of preferable solvents include carbonate compounds such as propylene carbonate, ethylene carbonate, diethyl carbonate, and dimethyl carbonate, a nitrile compound, and an aqueous solvent such as water.

The electrolytic solution may be, for example, a cross-linkable gel electrolytic solution or an ionic liquid made of an imidazole compound.

Figure 2:
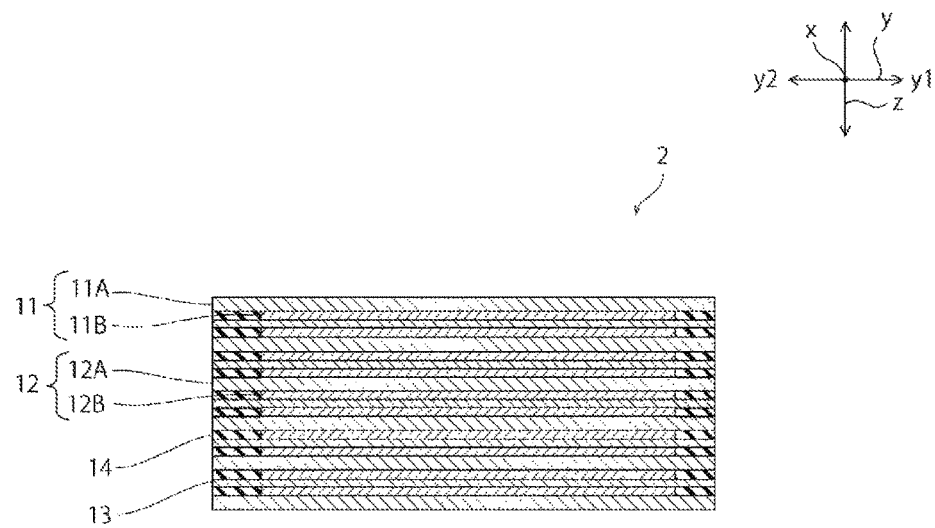
FIG. 2 is a schematic cross-sectional view of an electric double-layer capacitor element according to the embodiment of the present invention.

In the present embodiment, the first and second electric double-layer capacitor elements 1a and 1b are formed of an identical electric double-layer capacitor element 2. FIG. 2 illustrates a schematic cross-sectional view of the electric double-layer capacitor element 2.

As illustrated in FIG. 2, the electric double-layer capacitor element 2 includes a negative electrode 11, a positive electrode 12, a separator 13, and a bonding layer 14. One of the negative electrode 11 and the positive electrode 12 serves as a first or third electrode, and the other of the negative and the positive electrode serves as a second or fourth electrode.

The negative electrode 11 and the positive electrode 12 face to each other with the separator 13 interposed therebetween. Specifically, a plurality of the negative electrodes 11 and a plurality of the positive electrodes 12 are alternately laminated with the separator 13 interposed therebetween.

The negative electrode 11 includes a negative-electrode collective electrode 11A. The negative-electrode collective electrode 11A may be made of, for example, aluminum foil. The negative-electrode collective electrode 11A may have a thickness of, for example, 10 μm to 30 μm inclusive approximately. A negative-electrode polarizable electrode 11B is provided on the negative-electrode collective electrode 11A. Specifically, the negative-electrode polarizable electrode 11B is provided only on one of principal surfaces of the negative-electrode collective electrode 11A, which faces to the positive electrode 12. The negative-electrode polarizable electrode 11B may have a thickness of, for example, 10 μm to 30 μm inclusive approximately. The negative-electrode polarizable electrode 11B may be made of, for example, carbon.

Figure 3:
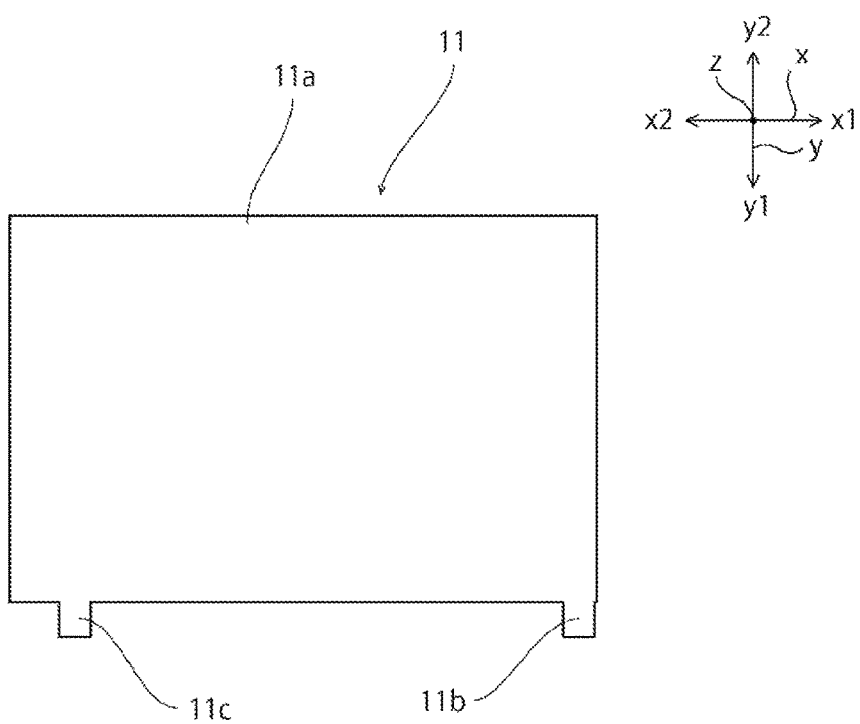
FIG. 3 is a schematic plan view of a positive electrode according to the embodiment of the present invention.

As illustrated in FIG. 3, the negative electrode 11 includes a negative electrode body 11a having a rectangular shape. The negative electrode body 11a faces to the positive electrode 12 with the separator 13 interposed therebetween. A corner of the negative electrode body 11a on an x1 side in the x-axis direction (first direction) and on a y1 side in a y-axis direction (second direction) is connected with an extended portion 11b having a rectangular shape and extending toward the y1 side. A corner of the negative electrode body 11a on an x2 side in the x-axis direction and on the y1 side in the y-axis direction is connected with an extended portion 11c having a rectangular shape and extending toward the y1 side.

Figure 4:
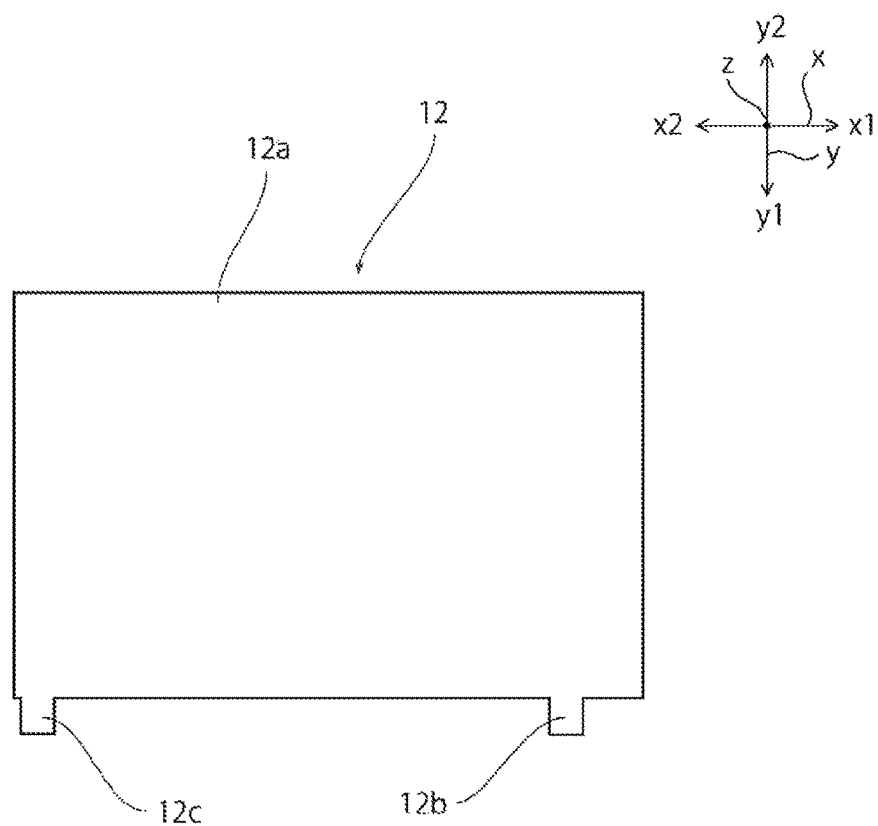
FIG. 4 is a schematic plan view of a negative electrode according to the embodiment of the present invention.

The positive electrode 12 illustrated in FIGS. 2 and 4 includes a positive-electrode collective electrode 12A. The positive-electrode collective electrode 12A may be made of, for example, aluminum foil. The positive-electrode collective electrode 12A may have a thickness of, for example, 10 μm to 30 μm inclusive approximately.

A positive-electrode polarizable electrode 12B is provided on the positive-electrode collective electrode 12A. Specifically, the positive-electrode polarizable electrode 12B is provided only on one of principal surfaces of the positive-electrode collective electrode 12A, which faces to the negative electrode 11. The positive-electrode polarizable electrode 12B may have a thickness of, for example, 10 μm to 30 μm inclusive approximately. The positive-electrode polarizable electrode 12B may be made of, for example, carbon.

As illustrated in FIG. 4, the positive electrode 12 includes a positive electrode body 12a having a rectangular shape. The positive electrode body 12a faces to the negative electrode 11 with the separator 13 interposed therebetween. A corner of the positive electrode body 12a on the x1 side in the x-axis direction and on the y1 side in the y-axis direction is connected with an extended portion 12b having a rectangular shape and extending toward the y1 side. A corner of the positive electrode body 12a on the x2 side in the x-axis direction and on the y1 side in the y-axis direction is connected with an extended portion 12c having a rectangular shape and extending toward the y1 side.

The negative electrode 11 and the positive electrode 12 adjacent to each other in a z-axis direction (thickness direction) are bonded to each other through the bonding layer 14.

As illustrated in FIG. 2, the separator 13 is provided between the negative electrode 11 and the positive electrode 12 adjacent to each other. The separator 13 has a flat plate shape larger than those of the negative electrode 11 and the positive electrode 12. The separator 13 separates the negative electrode 11 and the positive electrode 12 from each other. The separator 13 may be formed of, for example, a porous sheet including a plurality of open cells. The separator 13 is impregnated with the electrolytic solution.

The first and second cells 1c1 and 1c2 each include corners 1C1 to 1C4. The first corner 1C1 is positioned on the x1 side in the x-axis direction and on the y1 side in the y-axis direction. The second corner 1C2 is positioned on the x2 side in the x-axis direction and on the y1 side in the y-axis direction. The third corner 1C3 is positioned on the x1 side in the x-axis direction and on the y2 side in the y-axis direction. The fourth corner 1C4 is positioned on the x2 side in the x-axis direction and on the y2 side in the y-axis direction.

As illustrated in FIG. 1, in the first electric double-layer capacitor element 1a, the extended portion 11b of the negative electrode 11 and the extended portion 12b of the positive electrode 12 are positioned at the first corner 1C1. The extended portion 12b is positioned on an outer side (the x2 side) of the extended portion 11b in the x-axis direction. The extended portion 11c of the negative electrode 11 and the extended portion 12c of the positive electrode 12 are positioned at the second corner 1C2. The extended portion 11c is positioned on an inner side (the x1 side) of the extended portion 12c in the x-axis direction.

In the second electric double-layer capacitor element 1b, the extended portion 11c of the negative electrode 11 and the extended portion 12c of the positive electrode 12 are positioned at the second corner 1C2. The extended portion 11c is positioned on an outer side (the x1 side) of the extended portion 12c in the x-axis direction. The extended portion 11b of the negative electrode 11 and the extended portion 12b of the positive electrode 12 are positioned at the first corner 1C1. The extended portion 12b is positioned on an inner side (the x2 side) of the extended portion 11b in the x-axis direction.

The first electric double-layer capacitor element 1a includes a negative electrode terminal 15 connected with the extended portion 11b of the negative electrode 11 at the first corner 1C1 of the first cell 1c1. The negative electrode terminal 15 extends from the extended portion 11b toward the y1 side in the y-axis direction. The negative electrode terminal 15 is extended to the outside of the first cell 1c1 through a sealing portion 1c3 of the package 1c.

The first electric double-layer capacitor element 1a includes a positive electrode terminal 16 connected with the extended portion 12b of the positive electrode 12 at the first corner 1C1 of the first cell 1c1. The positive electrode terminal 16 extends from the extended portion 12b toward the y1 side in the y-axis direction. The positive electrode terminal 16 is extended to the outside of the first cell 1c1 through the sealing portion 1c3 of the package 1c.

The second electric double-layer capacitor element 1b includes a positive electrode terminal 17 connected with the extended portion 12c of the positive electrode 12 at the second corner 1C2 of the second cell 1c2. The positive electrode terminal 17 extends from the extended portion 12c toward the y1 side in the y-axis direction. The positive electrode terminal 17 is extended to the outside of the first cell 1c1 through the sealing portion 1c3 of the package 1c. The positive electrode terminal 17 and the negative electrode terminal 15 are electrically connected with each other through a connecting member 19.

The second electric double-layer capacitor element 1b includes a negative electrode terminal 18 extending from the extended portion 11c of the negative electrode 11 at the second corner 1C2 of the second cell 1c2 toward the y1 side in the y-axis direction. The negative electrode terminal 18 is extended to the outside of the first cell 1c1 through the sealing portion 1c3 of the package 1c.

As described above, in the present embodiment, the negative electrode terminal 15 extended from the package 1c at the first corner 1C1 of the first cell 1c1 is electrically connected with the positive electrode terminal 17 extended from the package 1c at the second corner 1C2 of the second cell 1c2, which is adjacent to the first corner 1C1 of the first cell 1c1. This configuration allows reduction of the length of the connecting member 19 connecting the negative electrode terminal 15 and the positive electrode terminal 17. Accordingly, the electric double-layer capacitor 1 can have a reduced equivalent series resistance.

When current flows through the electric double-layer capacitor 1, magnetic field is generated around the terminals 15 to 18, increasing the equivalent series inductance of the electric double-layer capacitor 1. When alternating-current power is applied while the equivalent series inductance is large, the electric double-layer capacitor has an increased impedance in a high-frequency region.

In the electric double-layer capacitor 1, the negative electrode terminal 15 and the positive electrode terminal 16 are provided close to each other at the first corner 1C1 of the first cell 1c1. With this configuration, a magnetic field generated around the negative electrode terminal 15 and a magnetic field generated around the positive electrode terminal 16 cancel each other. The positive electrode terminal 17 and the negative electrode terminal 18 are provided close to each other at the second corner 1C2 of the second cell 1c2. With this configuration, a magnetic field generated around the negative electrode terminal 18 and a magnetic field generated around the positive electrode terminal 17 cancel each other. In addition, since the negative electrode terminal 15 and the positive electrode terminal 17 are provided adjacent to each other, the magnetic field generated around the negative electrode terminal 15 and the magnetic field generated around the positive electrode terminal 17 cancel each other, thereby reducing the equivalent series inductance. Thus, increase of the impedance in a high-frequency region is effectively suppressed in the electric double-layer capacitor 1.

In the electric double-layer capacitor 1, the extended portions 11$b$, 11$c$, 12$b$, and 12$c$ are provided on the y1 side of the negative electrode body 11$a$ and the positive electrode body 12$a$. With this configuration, the electrolytic solution accumulates on the y1 side of the negative electrode body 11$a$ and the positive electrode body 12$a$ in each of the first and second cells 1$c$1 and 1$c$2. Thus, when the electrolytic solution is evaporated or leaked from the cells 1$c$1 and 1$c$2, the electrolytic solution between the negative electrode 11 and the positive electrode 12 is unlikely to run short. Accordingly, the electric double-layer capacitor 1 has a long lifetime.

The extended portions 11$b$ and 12$b$ are provided at the first corner 1C1, whereas the extended portions 11$c$ and 12$c$ are provided at the second corner 1C2. This configuration can suppress displacement of the electric double-layer capacitor elements 1$a$ and 1$b$ in the cells 1$c$1 and 1$c$2. Accordingly, stress applied to the extended portions 11$b$, 11$c$, 12$b$, and 12$c$ and the terminals 15 to 18 can be reduced. Thus, the extended portions 11$b$, 11$c$, 12$b$, and 12$c$ and the terminals 15 to 18 are unlikely to break. In addition, gaps are unlikely to be formed at the sealing portion 1$c$3 of the package 1$c$, thereby effectively suppressing evaporation and leakage of the electrolytic solution.

In the electric double-layer capacitor 1, when the sealing portion along a side edge of the package 1$c$ on the y1 side in the y-axis direction has a width L1 and the sealing portion positioned between the first cell 1$c$1 and the second cell 1$c$2 has a width L2, the relation of L1>L2 is satisfied. This configuration allows a large facing area of first and second internal electrodes, thereby achieving a large capacitance, a low resistance, and a long lifetime. Specifically, when the width L1 is increased, the speed of evaporation of the electrolytic solution is reduced so that the electric double-layer capacitor can have a longer lifetime. However, the width L2 does not affect the evaporation of the electrolytic solution. Thus, a large electrode area can be obtained by reducing the width L2 as much as possible.

(First Modification)

Figure 5:
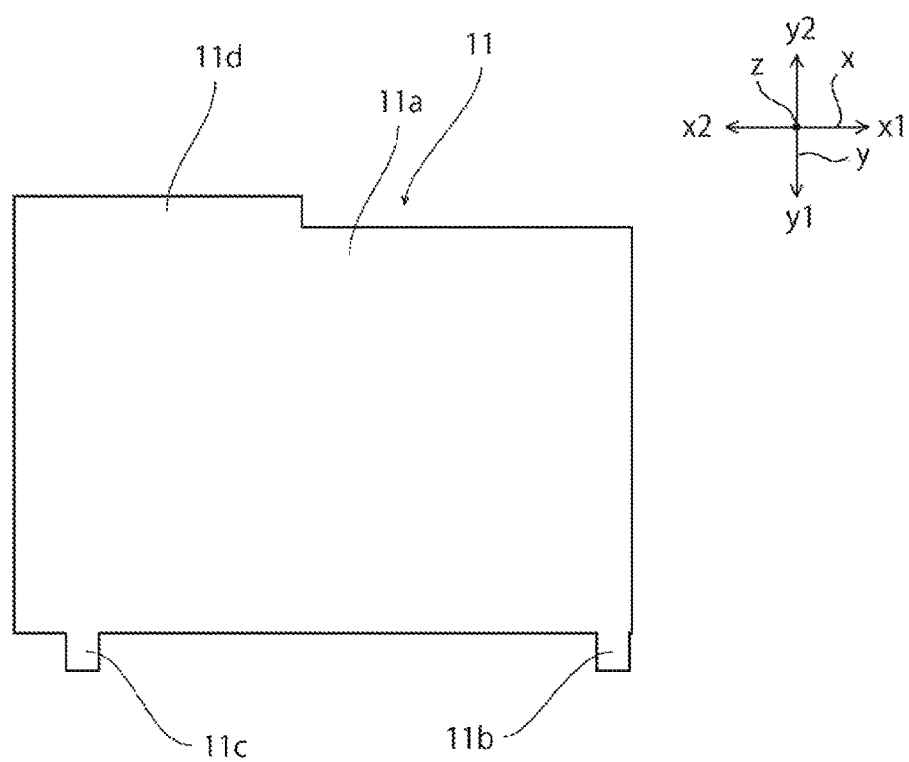
FIG. 5 is a schematic plan view of the positive electrode according to a first modification.
Figure 6:
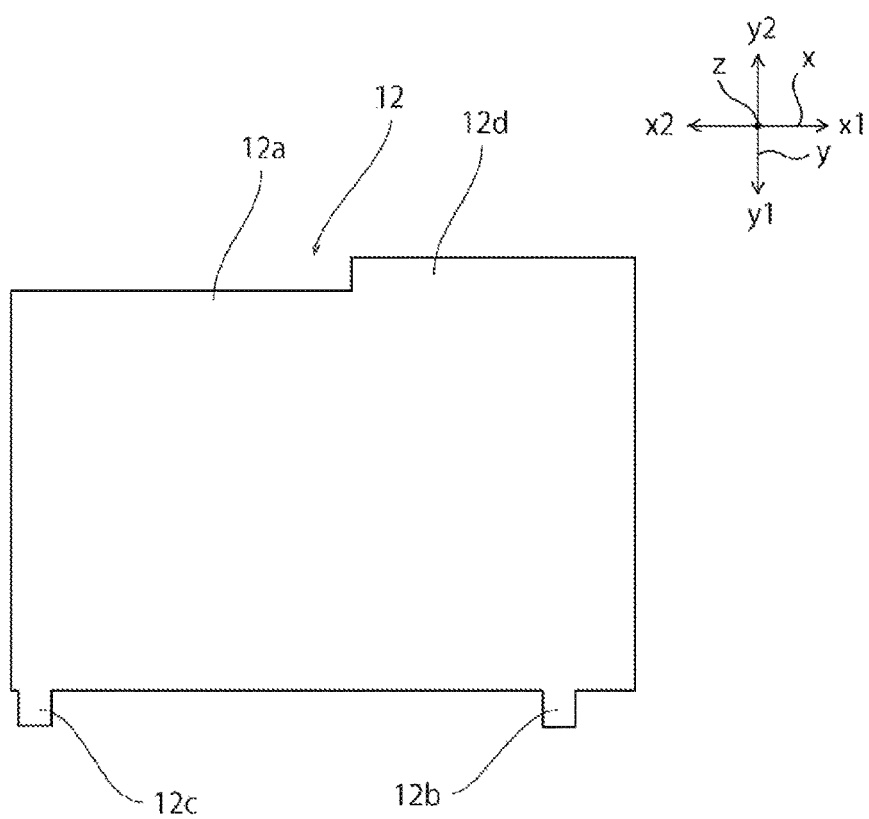
FIG. 6 is a schematic plan view of the negative electrode according to the first modification.

FIG. 5 is a schematic plan view of the positive electrode according to a first modification. FIG. 6 is a schematic plan view of the negative electrode according to the first modification.

As illustrated in FIG. 5, the negative electrode 11 includes an extended portion 11$d$ extending from part of the negative electrode body 11$a$ on the x2 side in the x-axis direction towards the y2 side in the y-axis direction. As illustrated in FIG. 6, the positive electrode 12 includes an extended portion 12$d$ extending from part of the positive electrode body 12$a$ on the x1 side in the x-axis direction toward the y2 side in the y-axis direction. In the present embodiment, these extended portions 11$d$ and 12$d$ are bonded to the separator 13.

(Second Modification)

Figure 7:
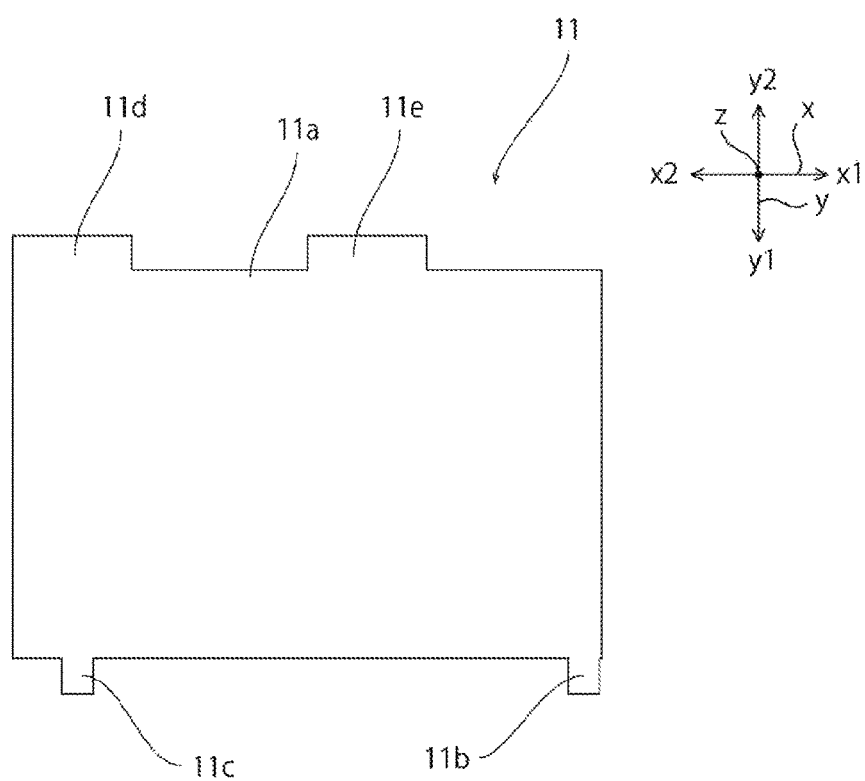
FIG. 7 is a schematic plan view of the positive electrode according to a second modification.
Figure 8:
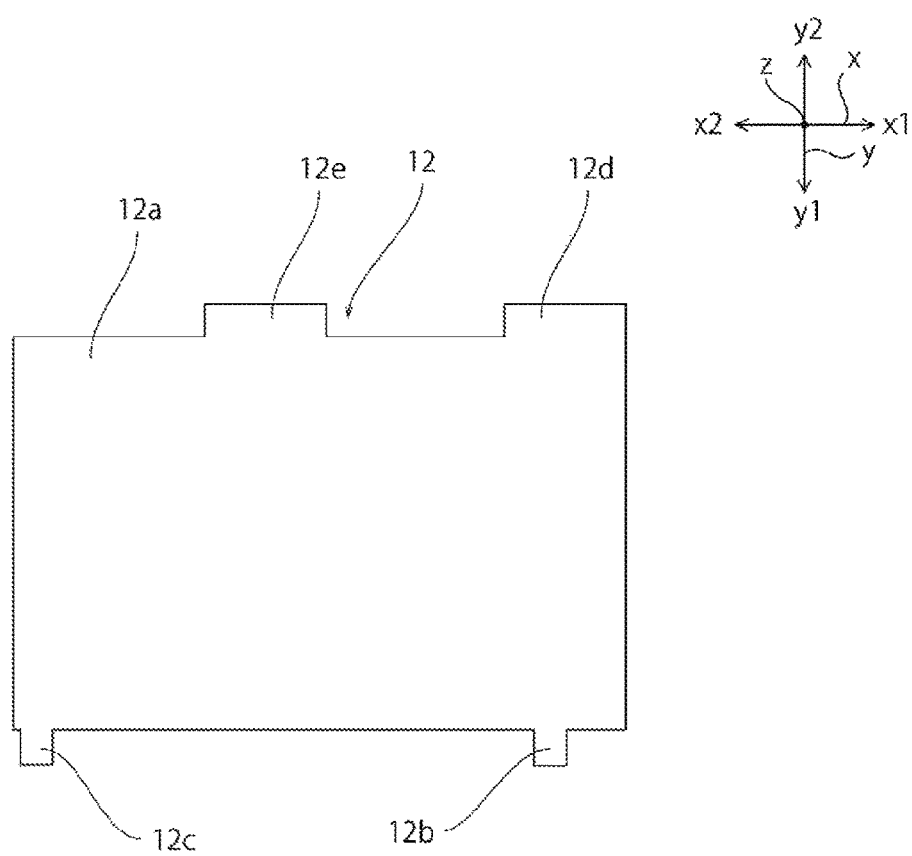
FIG. 8 is a schematic plan view of the negative electrode according to the second modification.

FIG. 7 is a schematic plan view of the positive electrode according to a second modification. FIG. 8 is a schematic plan view of the negative electrode according to the second modification.

As illustrated in FIG. 7, the negative electrode 11 includes a plurality of extended portions 11$d$ and 11$e$ extending from the negative electrode body 11$a$ toward the y2 side in the y-axis direction. As illustrated in FIG. 8, the positive electrode 12 includes a plurality of extended portions 12$d$ and 12$e$ extending from the positive electrode body 12$a$ toward the y2 side in the y-axis direction. In the present embodiment, the extended portions 11$d$, 11$e$, 12$d$, and 12$e$ are bonded to the separator 13. In this manner, the negative electrode 11 and the positive electrode 12 are each provided with a plurality of extended portions bonded to the separator 13, thereby suppressing peeling and bending of the electrodes and the separator. To more effectively suppress peeling and bending of the electrodes and the separator, it is preferable that a plurality of extended portions of the negative electrode 11 and a plurality of extended portions of the positive electrode 12 are provided alternately in the x-axis direction.

DESCRIPTION OF REFERENCE SYMBOLS

1: electric double-layer capacitor
1$a$: first electric double-layer capacitor element
1$b$: second electric double-layer capacitor
2: electric double-layer capacitor element
1$c$: package
1$c$1: first cell
1$c$2: second cell
1$c$3: sealing portion
1C1: first corner
1C2: second corner
1C3: third corner
1C4: fourth corner
11: negative electrode
11A: negative-electrode collective electrode
11B: negative-electrode polarizable electrode
11$a$: negative electrode body
11$b$, 11$c$, 11$d$, 11$e$: extended portion
12: positive electrode
12A: positive-electrode collective electrode
12B: positive-electrode polarizable electrode
12$a$: positive electrode body
12$b$, 12$c$: extended portion
13: separator
14: bonding layer
15, 18: negative electrode terminal
16, 17: positive electrode terminal
19: connecting member

The invention claimed is:

1. An electric double-layer capacitor comprising:
a first electric double-layer capacitor element having a rectangular shape and including first and second terminals;
a second electric double-layer capacitor element having a rectangular shape, disposed on one side in a first direction with respect to the first electric double-layer capacitor element, and including third and fourth terminals;
a package including a first cell having a rectangular shape and encapsulating the first electric double-layer capacitor element, and a second cell having a rectangular shape and encapsulating the second electric double-layer capacitor element; and
an electrolytic solution filling each of the first and second cells, wherein
the first terminal extends from the package at a first corner of the first cell, the first corner being adjacent to the second cell and on a first side of the package in a second direction orthogonal to the first direction,
the second terminal extends from the package at the first corner in the first direction, the second terminal being adjacent to the first terminal and on a side of the first terminal opposite to that of the second electric double-layer capacitor element, the third terminal extends from the package at a second corner of the second cell, the second corner being adjacent to the first cell and the first corner, and the fourth terminal extends from the package at the second corner in the first direction, the fourth terminal being adjacent to the third terminal and on a side of the third terminal opposite to that of the first electric double-layer capacitor element.

2. The electric double-layer capacitor according to claim 1, wherein the first direction is parallel to longitudinal directions of the first and second electric double-layer capacitor elements.

3. The electric double-layer capacitor according to claim 2, wherein the first electric double-layer capacitor element includes first and second electrodes facing each other, and the first and second electrodes each include:
a first electrode body having a rectangular shape;
a first extended portion positioned at the first corner, extending from the first electrode body toward the first side in the second direction, and is connected with one of the first and second terminals; and
a second extended portion positioned at a third corner of the first cell and extending from the first electrode body toward the first side in the second direction, and the second electric double-layer capacitor element includes third and fourth electrodes facing to each other, and the third and fourth electrodes each include:
a second electrode body having a rectangular shape;
a third extended portion positioned at the second corner, extending from the second electrode body toward the first side in the second direction, and is connected with the one of the third and fourth terminals; and
a fourth extended portion positioned at a fourth corner of the second cell and extending from the second electrode body toward the first side in the second direction.

4. The electric double-layer capacitor according to claim 1, wherein the first electric double-layer capacitor element includes first and second electrodes facing each other, and the first and second electrodes each include:
a first electrode body having a rectangular shape;
a first extended portion positioned at the first corner, extending from the first electrode body toward the first side in the second direction, and is connected with one of the first and second terminals; and
a second extended portion positioned at a third corner of the first cell and extending from the first electrode body toward the first side in the second direction, and the second electric double-layer capacitor element includes third and fourth electrodes facing to each other, and the third and fourth electrodes each include:
a second electrode body having a rectangular shape;
a third extended portion positioned at the second corner, extending from the second electrode body toward the first side in the second direction, and is connected with the one of the third and fourth terminals; and
a fourth extended portion positioned at a fourth corner of the second cell and extending from the second electrode body toward the first side in the second direction.

5. The electric double-layer capacitor according to claim 1, wherein, when a sealing portion along a side edge of the package on the first side in the second direction has a width L1 and a sealing portion positioned between the first and second cells of the package has a width L2, L1>L2.

6. The electric double-layer capacitor according to claim 3, wherein the first and second electrodes each further include a fifth extended portion extending from the first electrode body toward a second side opposite the first side in a third direction opposite the second direction; and the third and fourth electrodes each further include a sixth extended portion extending from the second electrode body toward the second side in the third direction.

7. The electric double-layer capacitor according to claim 4, wherein the first and second electrodes each further include a fifth extended portion extending from the first electrode body toward a second side opposite the first side in a third direction opposite the second direction; and the third and fourth electrodes each further include a sixth extended portion extending from the second electrode body toward the second side in the third direction.

8. The electric double-layer capacitor according to claim 3, wherein the first and second electrodes each further include a plurality of fifth extended portions extending from the first electrode body toward a second side opposite the first side in a third direction opposite the second direction; and the third and fourth electrodes each further include a plurality of sixth extended portions extending from the second electrode body toward the second side in the third direction.

9. The electric double-layer capacitor according to claim 4, wherein the first and second electrodes each further include a plurality of fifth extended portions extending from the first electrode body toward a second side opposite the first side in a third direction opposite the second direction; and the third and fourth electrodes each further include a plurality of sixth extended portions extending from the second electrode body toward the second side in the third direction.

* * * * *